(12) United States Patent
Carson et al.

(10) Patent No.: US 6,973,573 B1
(45) Date of Patent: Dec. 6, 2005

(54) DETECTION OF A DIGITAL DATA FINGERPRINT

(75) Inventors: Douglas M. Carson, Cushing, OK (US); Henry B. Kelly, Stillwater, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 918 days.

(21) Appl. No.: 09/792,166

(22) Filed: Feb. 23, 2001

Related U.S. Application Data

(60) Provisional application No. 60/184,231, filed on Feb. 23, 2000.

(51) Int. Cl.[7] ............................. H04L 9/00; G06F 11/30
(52) U.S. Cl. ...................................... 713/176; 713/201
(58) Field of Search ................................ 713/176, 179, 713/201; 380/201, 214, 216; 387/184; 705/57; 704/221, 251

(56) References Cited

U.S. PATENT DOCUMENTS

| | | | |
|---|---|---|---|
| 5,428,683 A | 6/1995 | Indeck, et al. | |
| 5,742,735 A | 4/1998 | Eberlein, et al. | |
| 5,751,672 A * | 5/1998 | Yankowski | ................. 709/238 |
| 6,053,406 A | 4/2000 | Litman | |
| 6,076,165 A | 6/2000 | Maenza | |
| 6,522,620 B1 * | 2/2003 | McPherson et al. | ..... 369/275.3 |

OTHER PUBLICATIONS

William Stallings, "Data and computer communications", 5th edition, 1997, ISBN 0024154253.*

* cited by examiner

Primary Examiner—Gregory Morse
Assistant Examiner—Peter Poltorak
(74) Attorney, Agent, or Firm—Fellers, Snider, et al.

(57) ABSTRACT

Method for determining and cataloguing a digital data file fingerprint. A data file, such as an audio file, is converted into digital format. The file is then sampled using at least one reference value. From the occurrences of the samples in the digital data file being equal to the reference value, a fingerprint is determined. This fingerprint is provided to a digital data file fingerprint database, along with proprietary and other related information. Users may then quickly ascertain the proprietary information from a data file through accessing the database with a fingerprint. Furthermore, users may detect whether or not a data file has been manipulated, such as compressed using modern compression technology, by comparing a fingerprint of the suspect data file with an original fingerprint found in the database.

11 Claims, 6 Drawing Sheets

| SAMPLE NUMBER (172) | SAMPLE VALUE (174) | REFERENCE VALUE (170) |
|---|---|---|
| 0 | 0000000000000001 | 0001000100110001 |
| 1 | 0000110010101000 | |
| 2 | 0000001100111000 | |
| 3 | 0001000100010001 | |
| 4 | 0000111111110000 | |
| 5 | 0001100110001101 | |
| 6 | 0001111001000100 | |
| 7 | 1000010000010111 | |
| 8 | 1100111010000010 | |
| 9 | 0101111110000011 | |
| . | . | |
| . | . | |
| . | . | |
| 65,533 | 0001000100010001 | |
| 65,534 | 0110000000111100 | |
| 65,535 | 1010001111100000 | |

FIG-5

| SAMPLE VALUE (176) | SAMPLE NUMBER (178) | Δ(SAMPLE NUMBER) (180) |
|---|---|---|
| 0001000100010001 | 3 | |
| 0001000100010001 | 12,843 | 12840 |
| 0001000100010001 | 27,859 | 15,016 |
| 0001000100010001 | 44,457 | 16,598 |
| 0001000100010001 | 65,533 | 21,076 |

FIG-6

| SAMPLE NUMBER (186) | SAMPLE VALUE (188) | REFERENCE VALUE #1 (182) |
|---|---|---|
| 0 | 0000100000010000 | 0000010000100000 |
| 1 | 0001000000100010 | REFERENCE VALUE #2 (184) |
| 2 | 0000010000100000 | 0100000000010001 |
| 3 | 1000010000100001 | |
| 4 | 0100000010000000 | |
| 5 | 0000000001000100 | |
| 6 | 1001000010000100 | |
| 7 | 0000010000001000 | |
| 8 | 1000000000010000 | |
| 9 | 0001000001001001 | |
| . | . | |
| . | . | |
| . | . | |
| 65,533 | 0000010000100000 | |
| 65,534 | 1000000001000000 | |
| 65,535 | 0010000001000100 | |

FIG-7

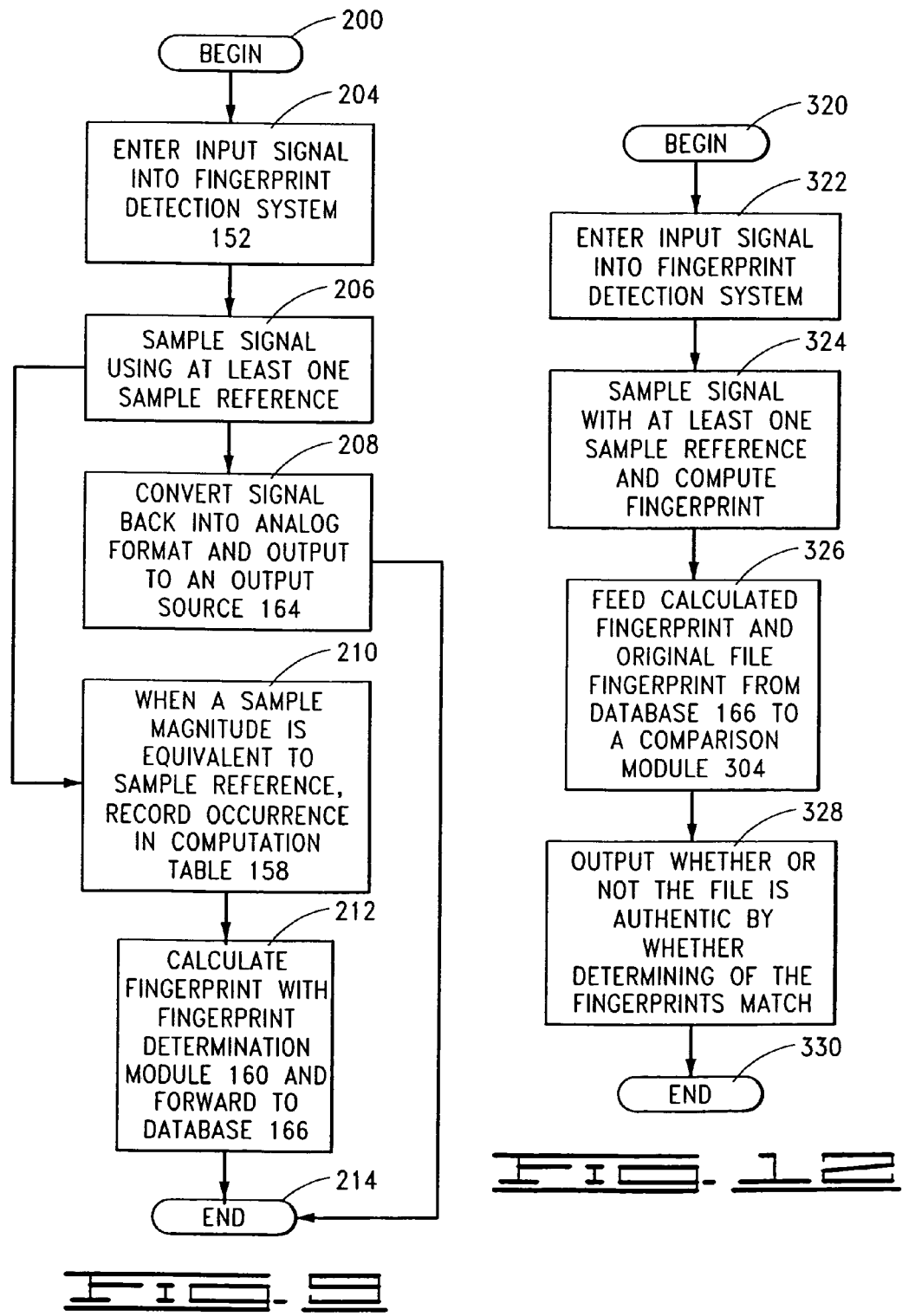

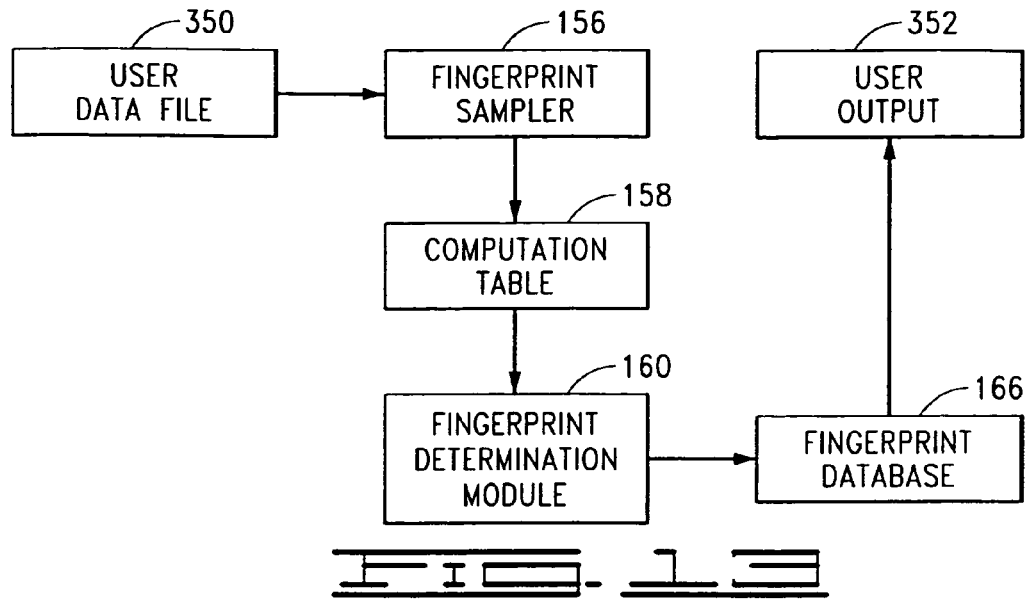
FIG. 13
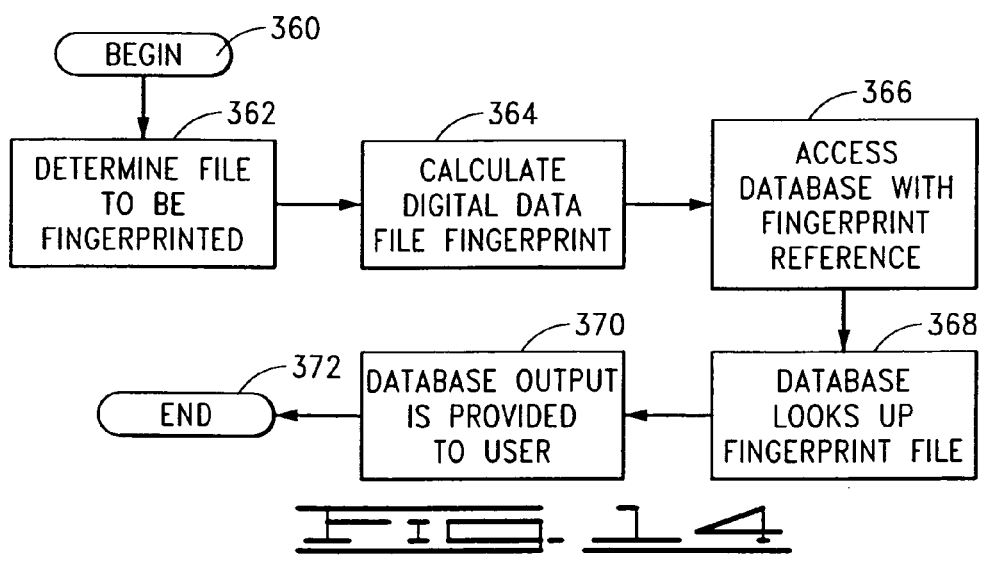
FIG. 14
| SAMPLE VALUE | SAMPLE NUMBER | Δ(SAMPLE NUMBER) |
|---|---|---|
| 0000010000100000 | 525 | |
| 0000010000100000 | 8,541 | 8,016 |
| 0100000000010001 | 11,137 | 2,596 |
| 0100000000010001 | 27,964 | 16,827 |
| 0000010000100000 | 49,551 | 21,587 |
| 0100000000010001 | 50,114 | 563 |
| 0000010000100000 | 62,475 | 12,361 |
FIG. 8

DETECTION OF A DIGITAL DATA FINGERPRINT

RELATED APPLICATIONS

This application claims priority to U.S. Provisional Application No. 60/184,231 filed Feb. 23, 2000.

FIELD OF THE INVENTION

The present invention relates generally to the field of data file manipulation and more particularly, but without limitation, to the fingerprint detection of a digital data sequence based on the frequency of and distance between occurrences of sample values.

BACKGROUND OF THE INVENTION

The copying or transmission of a data file has become increasingly easier. Technology has been developed to allow a person to reproduce a data file without the permission of the rightful owner. A data file can contain information that is capable of being formatted into digital format. The format in which the data file is stored also determines its portability.

There are currently several major digital format carriers used to transmit digital data files. Some of the more common formats are an audio compact disc (CD), a digital versatile disc (DVD), or a computer disc such as a CD-ROM.

An optical disc contains user data written to the disc in digital format represented by a combination of pits and lands. A DVD is similar to a CD, but is able to hold an extensively larger amount of user data. A typical CD can hold up to 74 minutes of audio music, whereas a DVD has the ability to hold up to 8 hours of music. The large disparity in data volume is due to several improvements. A DVD uses a different modulation encoding scheme to write the data to the disc. A typical CD uses eight-to-fourteen modulation and a DVD uses eight-to-sixteen modulation.

Also, a DVD provides the improved storage capacity through providing a higher data storage density through less data overhead and multi-layer storage capabilities. A typical CD has a track pitch of 1600 nanometers and a DVD has a track pitch of 740 nanometers. The pits on a DVD are also half the length of the CD pits, this allows for more content per track and a greater increase in the number of tracks per disc.

Another major difference between CDs and DVDs is the sampling rate of the digital signal. While the disc is being read, a digital data signal is created from the pits and lands. This signal is eventually used to construct the output signal. After decoding, error correction, and other signal processing events occur, a digital representation of the analog output signal is created. This digital signal is processed through a digital to analog converter and fed to an output device, such as an audio speaker or a video monitor. With a DVD, this output signal may be fed to appropriate channels as directed by the reading device.

A typical CD signal has a sample rate of 44.1 kHz having a sample range of 65,536, in 16 bit format. This means in one second of digital output from a CD reader, there are approximately 44,100 digital samples. Furthermore, there are a possible 65,536 different values for each sample. Whereas a DVD can have a 24 bit format, therefore it has a sample rate of 192 kHz with a sample range of 16,777,216. A one-second sample of a DVD reader digital output has 192,000 digital samples and there are a possible 16,777,216 different values for each sample. The number of samples directly affects the ability of the digital to analog converter to smoothly and properly recreate the original signal.

Another common format is commonly referred to as MP3, which is an abbreviation for MPEG-3 (Motion Picture Experts Group). The MP3 format allows a greater amount of data to be stored in a smaller file size, allowing the files to be more easily transferred over the Internet.

The increase in portability of digital data files increases the likelihood for unauthorized duplication of proprietary information. Users may now simply transfer and duplicate these files without having to be held accountable, thereby violating the intellectual property rights of the owners.

Previous methods have been developed to create and catalog fingerprints for a magnetic media. U.S. Pat. No. 5,920,628 issued to Indeck et al. teaches to create a fingerprint for a magnetic media by having a magnetic head dc saturate a portion of the medium, then read the remnant noise which remains. U.S. Pat. No. 5,920,628 also discusses cataloging the fingerprints for use of verification.

A problem often arises when a pirated data file is recovered, currently technology allows data files to be readily transferred between media. Therefore, a fingerprint of the media may not be detectable if the data file is in a different media. The prior art also fails to cover fingerprinting of data stored on non-magnetic media, such as an optical disc.

Often times, extensive time and effort are required to determine the true owner of the data file. Also, with the proliferation of techniques to combine multiple tracks on a common carrier, the task of finding the rightful owner can be even harder. For instance, a normal DVD can contain multiple tracks, each track related to different output sources. While on the DVD these tracks are interlaced, there exists the possibility of different proprietary rights affixed to the content of each channel.

Generally, there currently does not exist a method to attach such ownership information to the data file without some way or another affecting the quality of the original data. Also, if encoded data was placed within the data file, there exists the technology for such information to be removed during remastering or pirating. Which, once an illegal copy is found, the same problem of determining the true owner of the content exists.

Because of these considerations, there exists a continuing need in the art to determine a method to fingerprint a digital file, or even a sequence of digital data within the file without disturbing the file itself. There also exists a need in the art to quickly and to efficiently determine when a filed has been illegal copied and who is the rightful owner.

SUMMARY OF THE INVENTION

The present invention is directed to a method to detect an exclusive and naturally occurring fingerprint found in a digital data sequence. The fingerprint corresponds to the data and can be detected, irrespective of the medium upon which the sequence is located. The digital fingerprint allows for the immediate and accurate detection of proprietary information concerning the data sequence.

A digital data sequence is sampled according to a standard frequency and standard magnitude. One possible standard is the CD standard having a 16-bit data sequence at a frequency of 44.1 kHz. A one-second sample has a total of 44,100 sample values, each value having a possibility of 65,536 different magnitudes. A digital data fingerprint may be created from this sample.

In accordance with preferred embodiments, a reference magnitude value is chosen. A digital input signal is evaluated to identify samples in the signal having an associated magnitude equal to the reference magnitude value, and each such occurrence is noted in a computation table. After the digital data sequence has been completely sampled, the fingerprint is is determined in relation to the number of samples occurring between the entries in the computation table (i.e., the respective locations within the sequence at which each of the samples occurs).

In another embodiment, more than one sample value may be used on a digital data file. The digital data file is sampled and when the sample value is equivalent to any of the reference values, it is recorded in the computational table. Once the digital data file has been completely sampled, the fingerprint is calculated based on the frequency of reference values occurring in the data file.

A database is compiled wherein the digital data fingerprint is recorded. In addition to the fingerprint, proprietary information is entered into the database. Therefore, when a user needs to determine proprietary information relating a data file, the data file can be converted into digital format, if necessary, and sampled. From this sampling, the fingerprint can be determined and used to retrieve the information sought by the user from the database.

Another aspect of the present invention provides for the detection of the alteration of a digital data file by a direct comparison of a digital file with a known original fingerprint. If the database contains an original fingerprint, a suspect data file can be sampled. If the file has been altered, possibly through compression techniques used to transmit data over the Internet, the fingerprint of the suspect file will fail to match the fingerprint of the original. Therefore, the present invention may detect the illegal transmission of propriety data files by an analysis of the data file.

BRIEF DESCRIPTION OF THE DRAWINGS

FIG. 3 is the digital format of the analog signal of FIG. 1.

FIG. 5 is a table showing, in numerical format, the sampling of the digital data file using only one reference value, reference value included.

FIG. 6 is a computation table for a one reference value fingerprint.

FIG. 7 is a table showing, in numerical format, the sampling of the digital data file using multiple sample values, reference values included.

FIG. 8 is a computation table for a multiple value fingerprint.

FIG. 9 is a flowchart showing the steps taken to determine a digital data fingerprint.

FIG. 12 is a flowchart showing the steps taken in detecting and utilizing the digital data fingerprint database.

FIG. 13 is a system providing the user the ability to determine proprietary information of a digital data file through access to the database.

FIG. 14 is a flowchart showing the steps taken in FIG. 13 to access the proprietary information in the database.

DETAILED DESCRIPTION

The present invention is directed to the detection of a digital data file fingerprint. Furthermore, the present invention is directed to a central database capable of storing the fingerprints, along with proprietary information. The database may be accessed by a user having the fingerprint of a digital file, and will be able to retrieve the appropriate information concerning ownership, copyrights, and other matters relating to the digital file.

Figure 1:
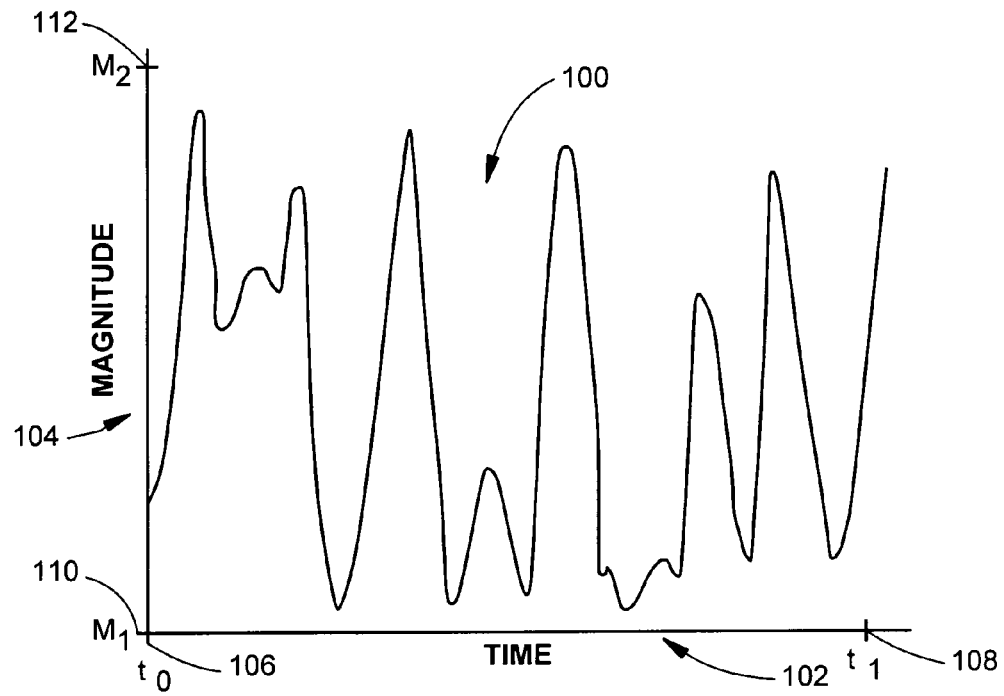
FIG. 1 is a sample of an analog signal represented within a set frequency and shown over a sample time period.

FIG. 1 shows an analog signal 100 plotted against an elapsed time axis 102 and a magnitude axis 104. This signal is in the continuous time domain over a range from time $t_0$ to time $t_1$ (respectively denoted at 106, 108). The analog signal 100 has a range of magnitudes within an interval bounded by a minimum magnitude $m_1$ and a maximum magnitude $m_2$ (respectively denoted at 110, 112). This analog signal is a useful format for data transmission and for certain output sources, such as an audio speaker for an audio file.

Figure 2:
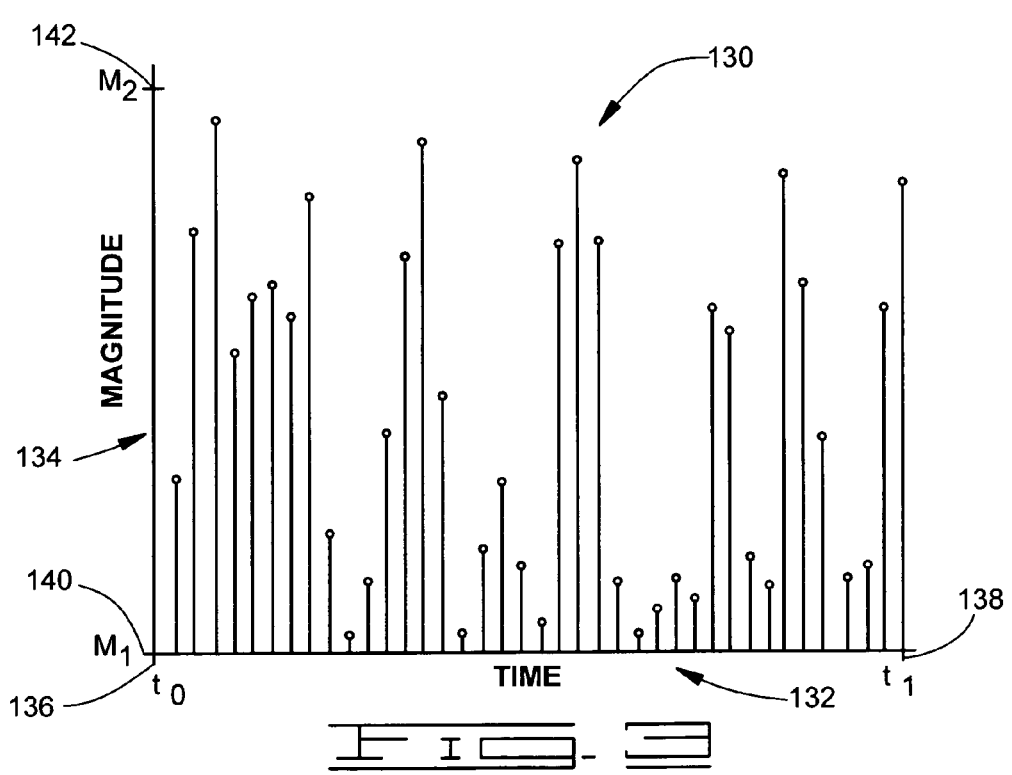
FIG. 2 is an analog to digital converter.
Figure 2:
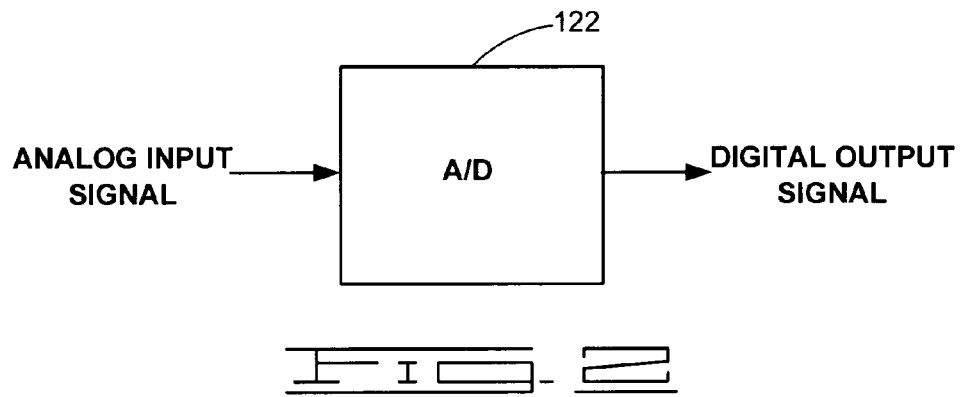

For many signal processing devices and storage devices, the data signal must be in digital format. A commonly used technique is to transform the signal via an analog to digital converter (A/D). FIG. 2 shows a typical conversion system in which an analog input signal, such as signal 100 of FIG. 1, is fed to an A/D 122, which converts the signal into a digital output signal based on several factors. One factor is sampling rate. Using a CD as an example, a sampling rate of 44.1 kHz is used, which translates to an output signal having 44,100 digital samples per each one second period. Another factor is the range of magnitudes of the signal. In a normal CD signal having a 16 bit format, each digital sample has a possibility of 65,536 different magnitudes. That is, because each digital signal sample is represented in a 16 bit binary format of "0"s and "1"s, there are a total of two to the sixteenth power possible magnitude values for each sample. There are numerous ways in which an analog signal may be converted to a digital signal, whether it be done by a continuous time sampling using a discrete time pulse train or other signal processing techniques.

The output of the A/D 122 of FIG. 2 is represented in FIG. 3 as a digital signal 130, which comprises a digital sampling of the analog signal 100 of FIG. 1. The digital signal 130 is plotted against an elapsed time axis 132 and a magnitude axis 134. The same time interval ($t_0$ to $t_1$) is illustrated for both FIG. 1 and FIG. 3 and is denoted at 136, 138 in FIG. 3.

Assuming the signal 130 of FIG. 3 represents a one-second interval, the digital signal 130 has a sampling rate of 39 Hz, as there are 39 digital samples at approximately 0.02564 second intervals over the range from $t_0$ to $t_1$ (136 to 138). Also shown in FIG. 3, the digital samples in the signal 130 have associated magnitudes that fall within the range $m_1$ to $m_2$ (140, 142).

It will be noted at this point that FIG. 3 is for illustration purposes only. If FIG. 3 represented a CD signal output, there would be 44,100 samples per second, instead of the 39 samples per second currently displayed. Also, for a CD the magnitude of the signal 130 would have a range from $m_1$ to $m_2$ (140 to 142) of 65,536 values (two to the sixteenth power).

If the signal of FIG. 3 were to represent a 24 bit DVD signal, the magnitude of the digital signal 130 would have a range of 16,777,216 different values (two to the twenty fourth power). The signal 130 would also have a sampling rate of 192 kHz containing 192,000 samples over the one second period.

Furthermore, the present invention is directly applicable to a DVD as well as a CD signal. While CDs offer dual channel signals, typically a left and a right channel, a DVD offers up to six current channels of data. For the purposes of finding a digital fingerprint, the multiple channel signals of either CDs or DVDs are parsed apart. The fingerprint is then determined on a channel by channel basis, as each channel will have a different content and may have varying proprietary information.

Figure 4:
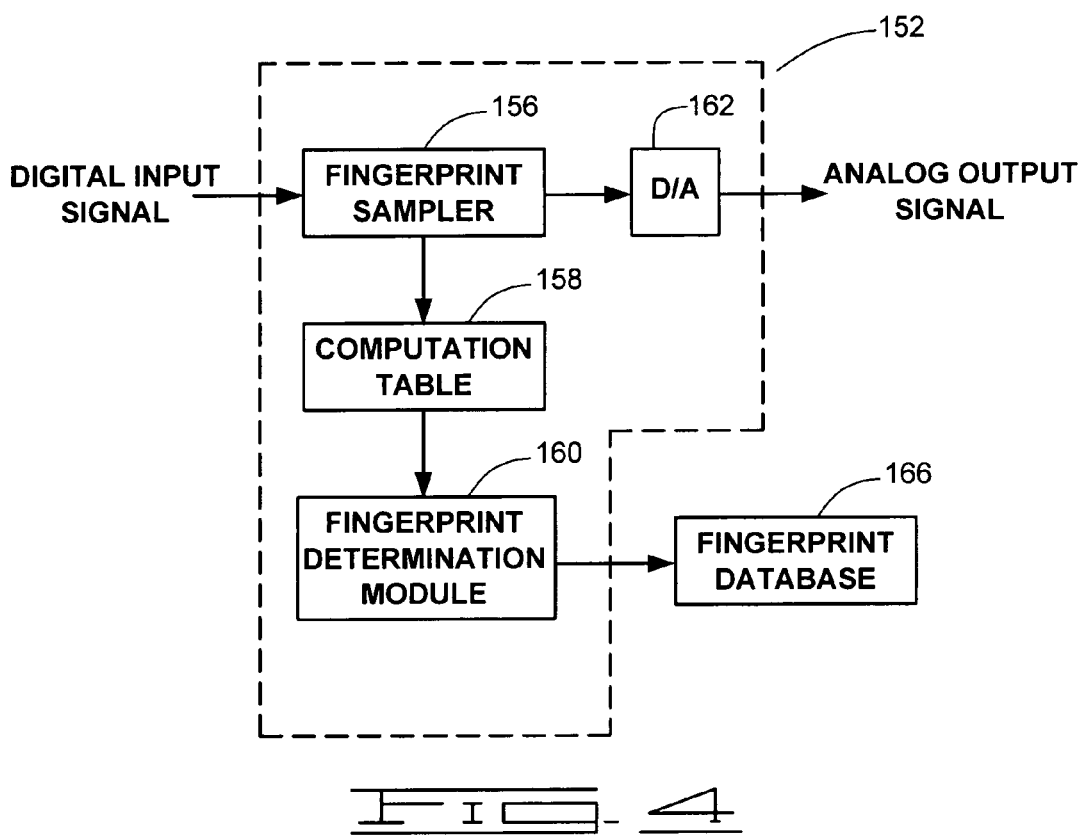
FIG. 4 is a representation of the digital data fingerprint calculation system.

It is a digital signal, such as the digital signal 130 represented in FIG. 3, from which the digital data file fingerprint is derived. A fingerprint determination system 152 used to create this fingerprint is represented in FIG. 4. A digital input signal is supplied to the fingerprint determination system 152. The system 152 has a fingerprint sampler 156 which samples the digital input signal and provides the sample outputs to a computation table 158. The table 158 then collects and forwards the sampling data to a fingerprint determination module 160, which calculates the digital data file fingerprint.

Within the fingerprint determination system 152 is a digital to analog converter (D/A) 162 which also receives the digital input signal from the fingerprint sampler 156. The D/A 162 converts the digital input signal to an analog output signal which is fed to an output source, such as an audio speaker or a video monitor. It should also be noted, if the output source is designated to receive a digital input signal, the fingerprint determination system 152 may bypass the D/A 162 to output a digital output signal. The system 152 provides a second output signal which is fed into a fingerprint database 166 where proprietary information relating to the input signal as well as the fingerprint itself are stored. The database 166 also provides user access to these fingerprints to retrieve the original fingerprint or proprietary information, as later discussed.

The fingerprint sampler 156 takes a slice of the digital input signal. Within this slice, there are a set number of digital samples covering a set magnitude range. Each sample of the digital input signal has an individual sample number extending consecutively from 136 to 138 ($t_0$ to $t_1$). Also, each sample of the digital input signal has a magnitude between 140 and 142 ($m_1$ to $m_2$).

For instance, a one-second slice of CD signal contains 44,100 data samples covering a range of 65,536 different values. From this magnitude range, a reference magnitude value is determined. The numerical aspects of this process are shown in FIG. 5, where an exemplary 16 bit sample value 0001000100010001 has been chosen, as denoted at 170.

The fingerprint sampler 156 then samples the digital data signal sequence using this reference value. When the sample value of the signal is identical to the reference value, the sample number is written to the computation table 158. This process is continued for each sample. When another sample number has a sample value equivalent to the reference value, its sample number is written to the computation table.

FIG. 5 shows a sample numerical representation of the sampling of the digital data signal. The reference value 170 is determined. For each sample 172, in this case sample numbers 0 to 65,535, the magnitude of the sample, or sample value 174, is compared to the reference value. When the two values are equivalent, it is recorded in the computation table, represented in FIG. 6. The computation table contains the sample value 176, the sample number 178, and the difference 180 between the sample numbers of the current sample and the previously recorded sample.

Once the slice of the digital signal has been sampled, the contents of the computation table, FIG. 6, are fed into the fingerprint determination module 160. Within this module 160, a fingerprint is calculated. In a preferred embodiment, the difference between sample numbers 180 is used to calculate the fingerprint. A sample fingerprint could be (12840 15,016 16598 21,076), as shown in FIG. 6.

In this embodiment, the fingerprint is then fed to the fingerprint database 166. Also recorded in the database is any other reference information so desired by the user. This database will now contain an entry having the above fingerprint, and the data file proprietary information. Furthermore, when a user needs to determine proprietary information relating a data file, a fingerprint may be taken and the used to access this information, as discussed below.

A preferred embodiment of the present invention uses the above described sampling method, but utilizes more than one sample value. The usage of multiple sample values increases the originality of the fingerprint and provides a broader scope of copy protection.

Similar to FIG. 5 except with multiple reference values, FIG. 7 numerically illustrates the sampling process. In this example, two reference values are chosen, a first reference value (0000010000100000) 182 and a second reference value (0100000000010001) 184. The fingerprint sampler 156 samples the digital input signal and, when a sample number 186 has a magnitude (sample value 188) equivalent to either reference value 182 or 184, it is recorded in the computation table.

FIG. 7 is a numerical representation of the computational table. In this embodiment, the sample value 190 is recorded, along with sample number 192. The full data signal slice is sampled, recording every occurrence of the sample value 188 being equal to either reference value 182 or 184. FIG. 7 shows a completed computation table, after a full sampling has been done. With this table, further data manipulation can be done to provide a fingerprint.

The difference between sample numbers 194 make up the digital data fingerprint. Therefore, the fingerprint (8,016 2,596 16,827 21,587 563 12,361) may be entered into the fingerprint database. Similar to the above embodiment, the user may then enter any proprietary information to be referenced with the fingerprint.

The flowchart of FIG. 9, steps 200 to 214, further illustrates the steps taken to detect and record the digital data file fingerprint. As shown in FIG. 9, any digital file is sampled according to at least one reference value, the fingerprint is found and entered in a database along with proprietary information.

The discussion is now directed to the available medium for which this present invention is directed. Any data file capable of being in digital format has a determinable data fingerprint. What is required is a standard sampling rate and reference values to each medium. The present invention can be used to determine if an optical disc contains data that may have been illegally copied. When an optical disc is mastered from an input source other than the original data file, there exists the possibility of the data content having minor variations. While these variations will not affect the data content and may not be detectable to the end user, the digital data file fingerprint will be different.

Figure 10:
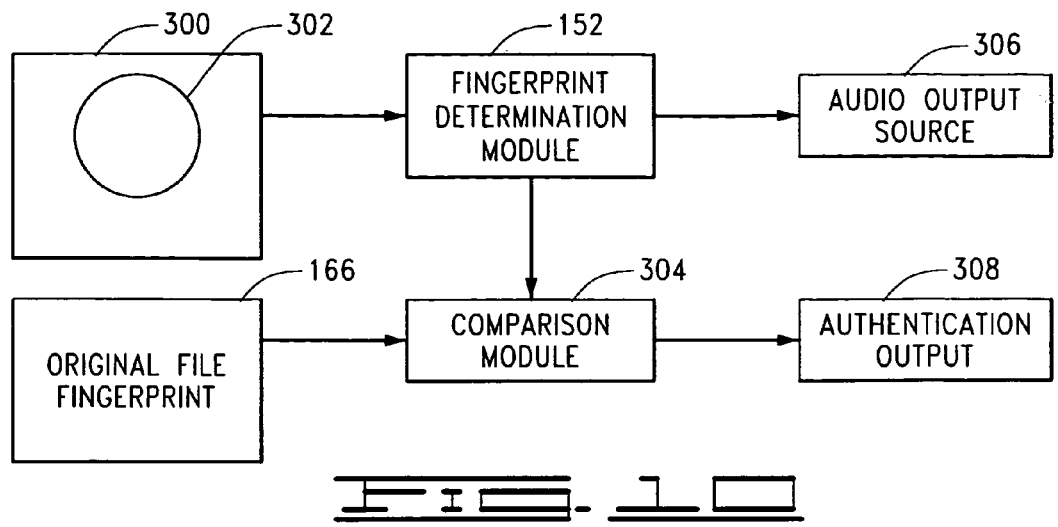
FIG. 10 is a system designed to detect and utilize the digital data fingerprint database from an optical disc source.

Since the fingerprint is based on the location and differences between occurrences of the sample values being equal to the reference value, any variations in the signal will produce a different fingerprint. One embodiment of a system used to detect the validity of a data file is illustrated by FIG. 10.

An optical disc reader 300 reads the data from a disc 302. The output is fed to a fingerprint determination module 152. The module 152 produces the fingerprint for the optical disc 302 and feeds this fingerprint to the comparison module 304. Concurrently, the audio signal is also sent to an output source 306 to verify the content of the optical disc 302. For instance, if the disc 302 is an audio CD, the output source may be an audio speaker.

The comparison module 304 also receives the original file fingerprint that is extracted from the fingerprint database 166. The comparison module 304 then directly compares the fingerprint extracted from the fingerprint determination modulate 152 with the original fingerprint from the database 166. The output of the comparison module 304 is then fed to an authentication module 308, where the user is notified of whether or not the disc has been authenticated as containing an identical fingerprint.

Another example of a medium to which the present invention may be directed is digital photography. The images are composed of a digital basis which, through signal processing, creates the digital image. Also in this category are motion pictures, such as MPEGs. The current advancements in MPEG technology are driven by the compression of data for easy portability across Internet transmission lines.

The present invention provides the ability to determine whether a file has been compressed. Compression technology removes data content thought to be extraneous or most capable of being regenerated. When the file is de-compressed, or expanded back to its original size, the decompression technology makes a best guess at what the actual file content is. While the reconstructed data file is a very close approximation, it is not an exact duplicate, therefore, the digital data fingerprint will not be identical.

The present invention provides a user, who has access to the original fingerprint of the data file, the ability to detect whether a digital data file has been compressed. The fingerprint of the suspect data file is taken in a similar manner as described above.

Figure 11:
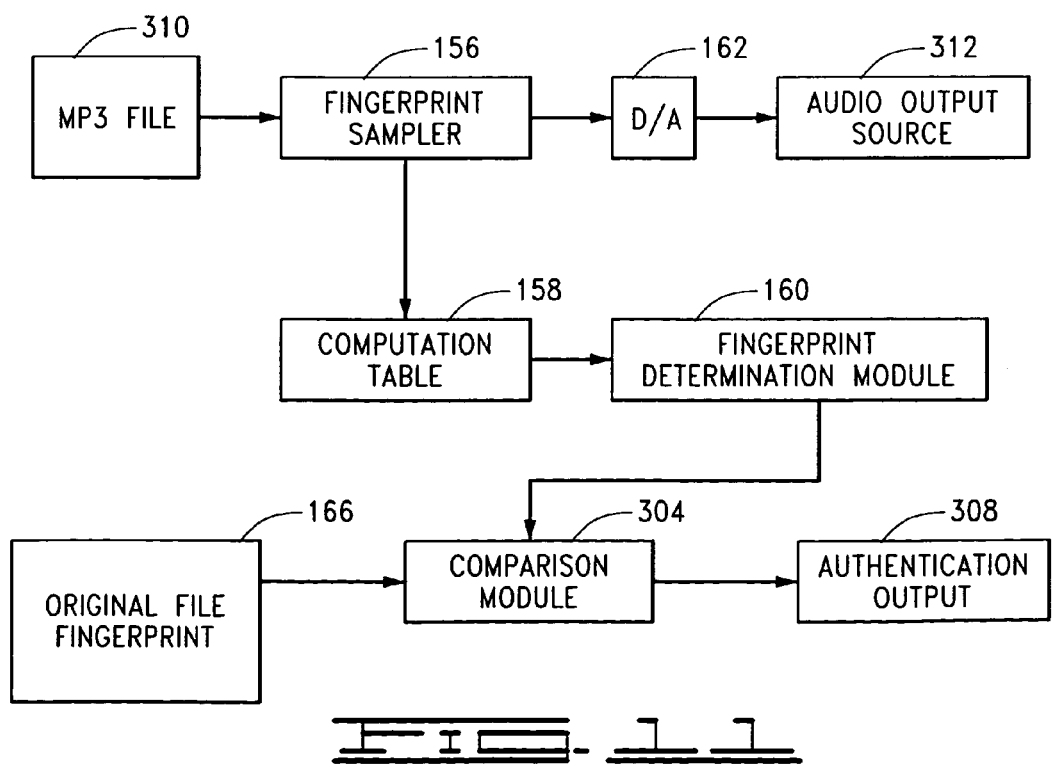
FIG. 11 is a system designed to detect and utilize the digital data fingerprint database from a digital data file input source.

FIG. 11 shows a system that determines whether a digital data file has been manipulated by compression technology. The MP3 file 310 is sent to a fingerprint sampler 156. The output of the sampler 156 is fed to both a D/A 162 and a computation table 158. The D/A 162 converts the MP3 file 310 into analog format where it is provided to an output source 312, such as an audio speaker.

The fingerprint sampler 156 also provides data to the computation table 158, data of the magnitude and sample number of occurrences of the sample magnitude being equal to a reference value. The computation table 158 compiles this information and forwards it to a fingerprint determination module 160. The module 160 calculates the MP3 file fingerprint and feeds this fingerprint to a comparison module 304.

The comparison module 304 also receives the original fingerprint of the MP3 file from the fingerprint database 166. The comparison module 304 determines if the fingerprints are identical and feeds this information to an authentication module 308. The authentication module 308 may then be used to notify the user of the authenticity of the MP3 file 310.

The flowchart of FIG. 12 further illustrates the process of using the digital data file fingerprint to determine the authenticity and or origin of an input signal. Steps 320 through 330 provide the steps taken to achieve this outcome.

Another object of the present invention is to provide users the ability to determine proprietary information about a digital data file. Using the system as shown in FIG. 13, the user enters the digital data file 350 into a fingerprint sampler 156. The sampler 156 samples the signal with at least one reference value and provides the output to the computation table 158. The fingerprint determination module 160 receives the data from the computation table 158 and calculates the fingerprint of the data file.

This fingerprint is then directed to the fingerprint database 166, where the proprietary information is stored. Using the fingerprint as the look-up reference, the database then matches the fingerprints and outputs the requisite information 352.

Therefore, should a user uncover a data file that has been cataloged within the fingerprint database 166, and the user needs to determine ownership rights in the data file, the user may obtain the needed information. By fingerprinting the data file and extracting the corresponding information from the database, the user can receive the proprietary information almost instantaneously.

FIG. 14 also provides a flow chart of this process. Steps 360 through 372 provide the user with direct access to all proprietary information of a digital data file simply through having the fingerprint of the data file. An example of the usage of the present invention for this purpose could be as follows. Should a user need to determine who owns the copyright to a background track used on a portion of the fifth channel on a DVD, the user can isolate the channel, determine the fingerprint of the file and quickly ascertain ownership information by running the fingerprint through the database. Whereas, prior to the fingerprint database, the user may require several days to several months of investigating to determine the proprietary information for this track.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method comprising:
providing a multi-channel digital data signal comprising a sequence of multi-bit digital samples each having an associated magnitude from a range of magnitudes from a minimum value to a maximum value;
choosing a sample value from within said range of magnitudes;
sampling at least one channel of the digital data signal using the sample value;
recording in a computation table each instance when one of the multi-bit digital samples of said at least one channel is equal to the sample value; and
determining and storing in a memory space a digital fingerprint for the digital data signal based on the computation table, wherein the fingerprint identifies a number of intervening samples in the sequence between each said instance.

2. The method of claim 1, further comprising:
entering the digital fingerprint into a digital data file database in a memory space; and
registering proprietary information of the digital data signal to the digital fingerprint in the digital data file database.

3. The method of claim 2, wherein the digital fingerprint is characterized as a first fingerprint, and wherein the method further comprises:

determining a second fingerprint of a second version of the data signal; and accessing the proprietary information concerning the signal by entering the second fingerprint in the digital data file database as a look-up reference to find the first fingerprint.

4. The method of claim 2, wherein the digital fingerprint is characterized as a first fingerprint, and wherein the method further comprises:

determining a second fingerprint of a second version of the signal; and comparing the second fingerprint with the first fingerprint to determine if the second version of the signal has been altered.

5. The method of claim 1 wherein the digital data signal is an analog data file converted into digital format.

6. The method of claim 1 wherein the sample value of the choosing step is characterized as a first value and the sampling step samples a first channel of the digital data signal using the first value, wherein the choosing step further comprises selecting a second value and the sampling step further samples a second channel of the digital data signal using the second value, and wherein the fingerprint is determined in relation to the first and second values.

7. A method comprising:

providing a multi-channel digital data signal comprising a sequence of multi-bit digital samples each having an associated magnitude from a range of magnitudes from a minimum value to a maximum value;

choosing a plurality of sample values;

sampling the digital data signal using the plurality of sample values;

for each sample value of the plurality of sample values, recording in a computation table in a memory space each instance where one of the multi-bit digital samples of the signal is equal to said sample value; and determining and storing in a memory space a digital fingerprint for the digital data signal based on the computation table, wherein the fingerprint identifies a number of intervening samples in the sequence between each said instance.

8. The method of claim 7 wherein the digital fingerprint of the determining and storing step is stored to a database.

9. The method of claim 7 wherein the first reference magnitude value is equal to the second reference magnitude value.

10. The method of claim 7 wherein the first reference magnitude value is greater than or lesser than the second reference magnitude value.

11. The method of claim 7 wherein the digital input signal is formed from an analog file converted into digital format.

* * * * *